United States Patent [19]

Bauer

[11] 4,241,486
[45] Dec. 30, 1980

[54] METHODS OF MAKING A REVERSING VALVE CONSTRUCTION AND A VALVE MEMBER THEREFOR

[75] Inventor: Werner R. Bauer, Radnor, Pa.

[73] Assignee: Robertshaw Controls Company, Richmond, Va.

[21] Appl. No.: 34,264

[22] Filed: Apr. 30, 1979

Related U.S. Application Data

[62] Division of Ser. No. 825,958, Aug. 19, 1977, Pat. No. 4,188,975.

[51] Int. Cl.³ .............................................. B23P 15/00
[52] U.S. Cl. .............................................. 29/157.1 R
[58] Field of Search ................. 29/157.1 R; 251/171, 251/175, 176, 182, 183, 186, 189; 137/625.25, 625.63, 625.66

[56] References Cited

U.S. PATENT DOCUMENTS

| | | | |
|---|---|---|---|
| 3,032,312 | 5/1962 | Greenawalt | 251/356 |
| 3,056,574 | 10/1962 | Greenawalt | 251/31 |
| 3,357,453 | 12/1967 | Mingrone et al. | 137/625.63 |
| 3,532,321 | 10/1970 | Bowman et al. | 251/175 |
| 3,610,285 | 10/1971 | Passaggio | 137/625.66 |
| 3,773,082 | 11/1973 | Davis | 251/31 |
| 3,985,154 | 10/1976 | Hargraves | 137/625.29 |
| 4,022,426 | 5/1977 | Read | 251/171 |

Primary Examiner—Daniel C. Crane
Attorney, Agent, or Firm—Candor, Candor & Tassone

[57] ABSTRACT

A reversing valve construction having a housing provided with a chamber carrying a movable piston-like valve member therein that controls ports of a valve seat of the housing through the relative position of a passage of the valve member relative to the ports. A one-piece flexible sealing skirt is carried by the valve member and extends outwardly therefrom in a cantilevered manner adjacent the valve seat means so as to be adapted to be exposed to fluid pressure in the chamber that will act directly thereon and cause the flexible skirt to flex and engage the valve seat means in a manner to tend to sealingly conform to the contour of the valve seat means and thereby seal the passage means of the valve member to the valve seat means while permitting sliding movement therebetween.

30 Claims, 10 Drawing Figures

METHODS OF MAKING A REVERSING VALVE CONSTRUCTION AND A VALVE MEMBER THEREFOR

CROSS-REFERENCE TO RELATED APPLICATION

This application is a divisional patent application of its copending parent patent application, Ser. No. 825,958, filed Aug. 19, 1977, now U.S. Pat. No. 4,188,975.

BACKGROUND OF THE INVENTION

1. Field of the Invention

This invention relates to an improved reversing valve construction and method of making the same as well as to an improved valve member therefor and method of making the same.

2. Prior Art Statement

It is well known that reversing valve constructions for heat pump systems and the like have been provided wherein each includes a housing means carrying a movable piston-like valve member that controls port means of a valve seat means of the housing means through the relative position of passage means of the valve member relative to the port means.

For example, see the following four U.S. Patents:
No. 3,032,312—Greenawalt
No. 3,056,574—Greenawalt
No. 3,357,453—Mingrone et al
No. 3,985,154—Hargraves Each reversing valve construction of the above four patents appears to have a rigid and non-flexible valve member disposed in sliding contact with its cooperating valve seat surface, the first three above patents each having the valve seat means thereof formed by a separate part disposed and secured in the housing means and being provided with a flat surface against which a flat surface of the movable valve member engages and slides in sealing relation therewith whereas the above patent to Hargraves has the valve seat means formed from a non-formed part of a cylindrical tubular housing member so as to be provided with an arcuate surface against which an arcuate surface of the valve member slides in sealing relation therewith.

Actual production devices that appear similar to the above four patents were examined and those similar to Mingrone et al and Hargraves were found to have rigid metallic surfaces of the valve members to be disposed in sliding relation with respective metallic surfaces of the valve seat means, the device similar to the patent to Greenawalt, U.S. Pat. No. 3,032,312 was found to have a non-flexible and rigid plastic annular part forming the sliding surface of the valve member and being captured at its inner and outer peripheries by metallic retainers of the valve member whereby the entire valve member is rigid, and the device similar to the patent to Greenawalt, U.S. Pat. No. 3,056,574 was found to have the entire valve member formed of plastic material and of such a thickness that the same is not flexible.

SUMMARY OF THE INVENTION

The efficiency of each such reversing valve constructions depends upon its leakage and pressure drop characteristics across the valve member thereof so that the closer the tolerances can be made between the mating surfaces of the valve member and the valve seat means, the more efficient is the resulting reversing valve construction.

However, it was found according to the teachings of the invention in applicant's copending patent application, Ser. No. 825,956, filed Aug. 19, 1977, that improved sealing means can be provided between such a movable valve member and its cooperating valve seal means to improve the efficiency of the resulting reversing valve construction.

In particular, one embodiment of that invention provides a flexible sealing member disposed between the valve member of the reversing valve construction and the valve seat means thereof to seal the passage means of the valve member to the valve seat means while permitting sliding movement therebetween, the flexible sealing member being urged into sealing engagement with the valve seat means by biasing means that is operatively associated with the valve member and the flexible sealing member.

It is also a feature of applicant's other copending patent application, Ser. No. 825,957, filed Aug. 19, 1977, to utilize such a sealing means with a housing means and a valve member similar to those disclosed in the aforementioned patent to Hargraves, U.S. Pat. No. 3,985,154.

In particular, one embodiment of the reversing valve construction of that invention provides a housing means that has the valve seat means thereof formed with an arcuate cross-sectional surface, the valve member also being formed with an arcuate cross-sectional surface disposed adjacent the arcuate surface of the valve seat whereby the flexible sealing member is disposed intermediate the arcuate surfaces.

In this manner, the housing means of that invention can be made from a tubular member in the same manner as the housing means of the aforementioned U.S. Pat. No. 3,985,154 as a part of the cylindrical side wall means of the tubular housing member forms the valve seat without further forming thereof.

It is a feature of this invention to provide an improved valve member for a reversing valve construction, such as for any one of the aforementioned and described reversing valve constructions.

In particular, one embodiment of the valve member of this invention has a one-piece flexible sealing skirt carried by the valve member and extending outwardly therefrom in a cantilevered manner so as to be disposed adjacent the valve seat means of the respective reversing valve construction so as adapted to be exposed to fluid pressure in the chamber that will act directly thereon and cause the flexible skirt to flex and engage the valve seat means in a manner to tend to sealing conform to the contour of the valve seat means and thereby seal the passage means of the valve member to the valve seat means while permitting sliding movement therebetween.

In this manner, the flexible sealing skirt of this invention performs the same function as the combined sealing member and biasing means therefor of the reversing valve constructions previously described.

Accordingly, it is an object of this invention to provide an improved reversing valve construction having one or more of the novel features of this invention as set forth above or hereinafter shown or described.

Another object of this invention is to provide a method of making such a reversing valve construction, the method of this invention having one or more of the novel features of this invention as set forth above or hereinafter shown or described.

Another object of this invention is to provide an improved valve member for a reversing valve construction, the valve member of this invention having one or more of the novel features of this invention as set forth above or hereinafter shown or described.

Another object of this invention is to provide a method of making such a valve member, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 2 is a cross-sectional view taken on line 2—2 of FIG. 1 and illustrates the prior art reversing valve construction of FIG. 1 in a heat pump system or the like.

DESCRIPTION OF THE PREFERRED EMBODIMENTS

While the various feature of this invention are hereinafter described and illustrated as being particularly adapted to provide a reversing valve construction for a heat pump system, it is to be understood that the various features of this invention can be utilized singly or in any combination thereof to provide a reversing valve construction for other systems as desired.

Therefore, this invention is not to be limited to only the embodiments illustrated in the drawings, because the drawings are merely utilized to illustrate one of the wide variety of uses of this invention.

Figure 1:
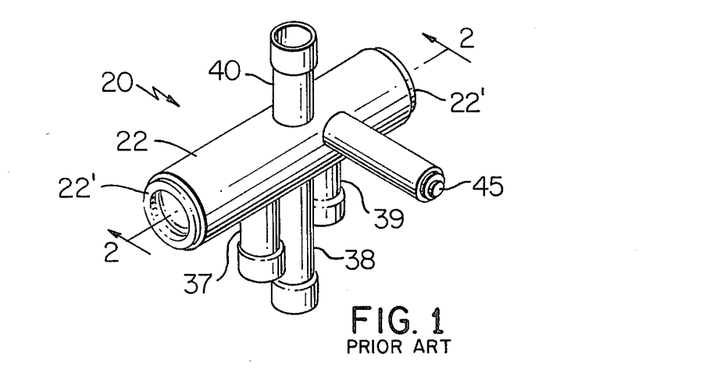
FIG. 1 is a perspective view of a prior art reversing valve construction.
Figure 2:
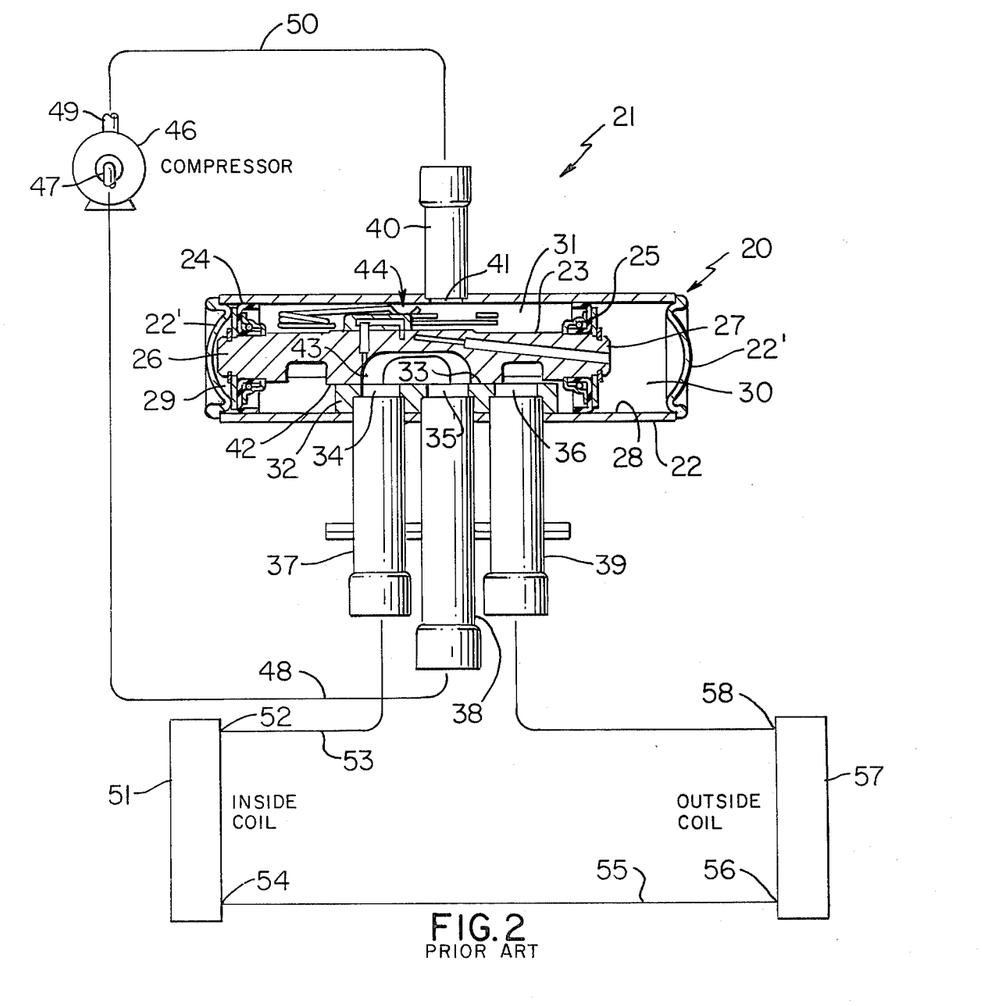

Referring now to FIGS. 1 and 2, a prior known reversing valve construction is generally indicated by the reference numeral 20 and is illustrated in FIG. 2 for controlling a heat pump system that is generally indicated by the reference numeral 21, the reversing valve construction 20 being fully disclosed and claimed in the aforementioned U.S. Pat. No. 3,357,453 to Mingrone et al which provides all of the details of the structure and operation of the reversing valve construction 20 so that the same need not be fully described herein.

However, in order to understand the improved features of this invention, the prior known reversing valve construction 20 will be generally described in connection with the heat pump system 21.

In particular, the prior known reversing valve construction 20 includes a metallic tubular housing member 22 having a movable metallic piston-like valve member 23 slidingly disposed therein and having piston portions 24 and 25 disposed at the opposed ends 26 and 27 thereof to sealingly cooperate with the internal peripheral surface 28 of the tubular housing member 22 and end closures 22' to define end chambers 29 and 30 therewith and separating the end chambers 29 and 30 from a central chamber 31 thereof.

A metallic valve seat member 32 is secured in the housing member 22 and defines a flat valve seat surface 33 that is interrupted by three ports 34, 35 and 36 respectively fluidly interconnected to metallic tubular connectors 37, 38 and 39 while a similar metallic tubular connector 40 is disposed in fluid communication with a port 41 formed in the tubular housing member 22 opposite the valve seat 32 as illustrated.

The movable valve member 23 has a lower flat surface 42 disposed in sliding and sealing engagement with the flat surface 33 of the valve seat 32 and is interrupted by a cavity 43 that defines a passage means which is adapted to fluidly and sealingly interconnect the ports 34 and 35 of the valve seat 32 together when the valve member 23 is disposed in the position illustrated in FIG. 2 while the port 36 is permitted to be disposed in fluid communication with the central chamber 31 of the housing means 32 and thus, to the tubular connector 40 as illustrated. However, when the valve member 23 is moved to the right in FIG. 2, the passage means 43 of the valve member 23 fluidly and sealingly interconnects the ports 35 and 36 together while permitting the port 34 to be disposed in fluid communication with the internal chamber 31 of the housing means 22 and, thus, in fluid communication with the tubular connector 40 for a purpose hereinafter described.

The movement of the valve member 23 relative to the housing means 22 is accomplished by directing fluid pressure to either the chamber 29 or the chamber 30 by means of a movable pilot valve means 44 carried on the valve member 23 and being controlled by a solenoid operated plunger 45, FIG. 1, in a manner fully set forth in the aforementioned U.S. Pat. No. 3,357,453.

The heat pump system 21 includes a refrigerant compressor 46 having the inlet side 47 thereof interconnected by a passage 48 to the tubular connector 38 while its outlet side 49 is interconnected by a passage 50 to the tubular connector 40.

An inside coil 51 of the heat pump system 21 has one side 52 thereof interconnected by a passage 53 to the tubular connector 37 while the other side 54 of the inside coil 51 is interconnected by an expansion capillary passage 55 to one side 56 of an outside coil 57. The other side 58 of the outside coil 57 is interconnected by a passage 59 to the tubular connector 39.

When the valve member 23 of the reversing valve 20 of the system 21 is disposed in the position illustrated in FIG. 2 by means of the pilot valve means 44 directing fluid pressure to the end chamber 30 while exhausting the end chamber 29, the heat pump system 21 is acting in its cooling cycle as the hot gas output from the output side 49 of the compressor 46 is being directed through the chamber 31 of the reversing valve 20 into the tubular connector 39 and, thus, to the side 58 of the outside coil which then returns through the expansion capillary passage 55 to the inside coil 51 and through the interconnected ports 34 and 35 of the valve seat 52 to the inlet side 47 of the compressor 46 whereby the inside coil 51 provides its cooling function.

Should it be desired to reverse the heat pump system 21 to a heating cycle thereof, the pilot valve means 44 is actuated so as to direct fluid pressure to the end chamber 29 of the reversing valve 20 while exhausting the end chamber 30 thereof to move the movable valve member 23 to the right in FIG. 2 to now interconnect the ports 35 and 36 through the passage 43 of the valve member 23. In this manner, the flow of hot gases from the outlet 49 of the compressor 46 is now directed to the port 34 of the valve seat 32 and, thus, to the side 52 of the inside coil which now performs its heating function. The return from the inside coil 51 is directed by the expansion capillary passage 55 to the outside coil 57 and, thus, from the outside coil 57 through the interconnected passages 36 and 35 of the valve seat 32 back to the inlet side 47 of the compressor 46 in a manner well known in the art.

Thus, it can be seen that the reversing valve construction 20 can be utilized to reverse the cycle of operation of heat pump system 21 in the above manner.

However, the efficiency of the reversing valve construction 20 depends upon leakage and pressure drop across the valve member 23 caused by the high pressure in chamber 31 and the low pressure in the passage means 43 of the valve member 23 and this is controlled by the sealing effect between the cooperating flat surfaces 42 and 33 of the valve member 23 and valve seat 32 as the flow of low pressure fluid continuously takes place through the passage means 43 of the valve member 23 and its particular pair of sealed ports 35 and 35 or 35 and 36 while the chamber 31 containing the valve member 23 is under a high pressure as long as the system 21 is operating.

As previously stated, it was found according to the teachings of the invention of applicant's aforementioned copending patent applications that improved sealing can be provided between the movable valve member 23 and the valve seat 32 of the prior known reversing valve construction 20 to improve upon the efficiency thereof.

It was also previously stated that it was a feature of this invention to utilize an improved valve member that provided improved sealing.

Figure 3:
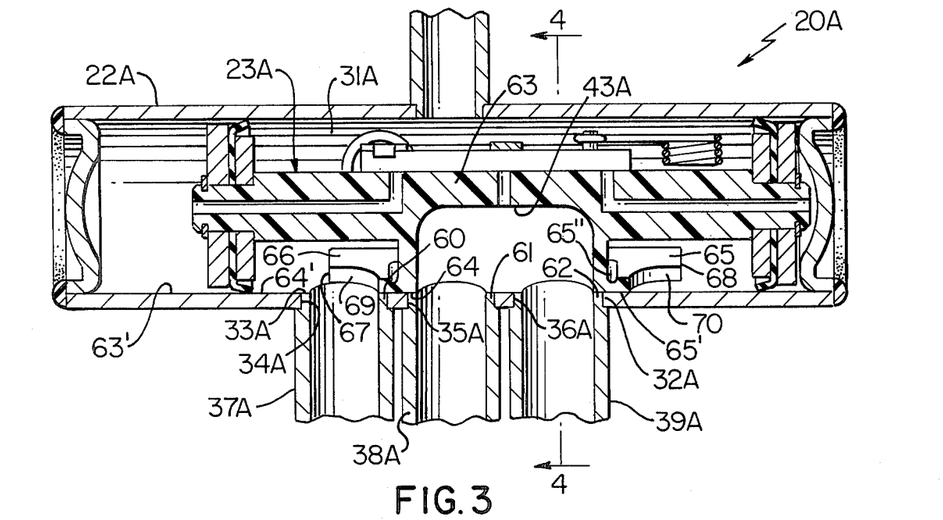
FIG. 3 is an enlarged cross-sectional view similar to FIG. 2 and illustrates one of the improved reversing valve constructions of this invention.
Figure 4:
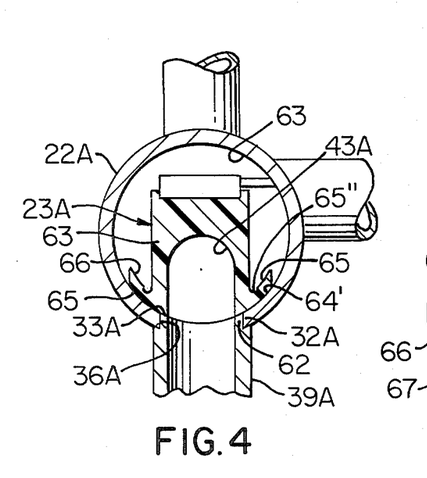
FIG. 4 is a cross-sectional view taken on line 4—4 of FIG. 3.
Figure 5:
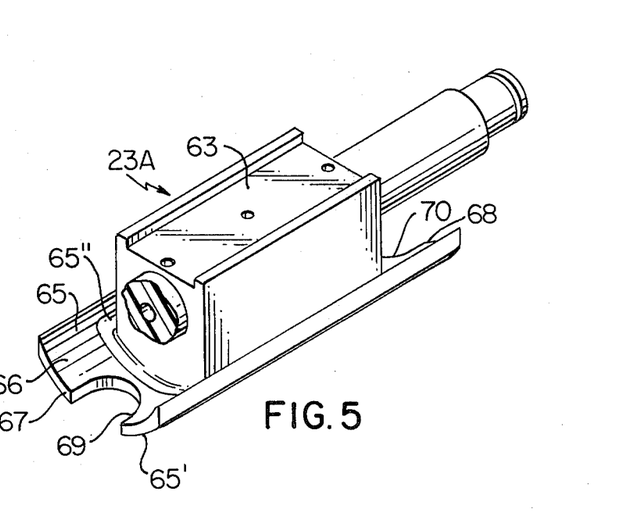
FIG. 5 is a perspective view of the improved sealing valve member of this invention that is utilized in the reversing valve construction of FIGS. 3 and 4.

Accordingly, such an improved reversing valve construction of this invention is generally indicated by the reference numeral 20A in FIGS. 3–5 and parts thereof similar to the reversing valve construction 20 previously described are indicated by like reference numerals followed by the reference letter "A".

As illustrated in FIGS. 3–5, the reversing valve construction 20A of this invention includes the tubular housing means 22A formed of metal or any other suitable material and an improved movable valve member 23A, but instead of the separate metallic valve seat member 32 of the valve construction 20, an integral and homogeneous part of the tubular housing means 22A of this invention itself defines the valve seat means 32A which has an arcuate cross-section surface 33A that is interrupted by the ports 34A, 35A and 36A which respectively receive suitably shaped ends 60, 61 and 62 of the tubular connectors 37A, 38A and 39A to complete the valve seat means 32A.

In this manner, it can be seen that the tubular housing means 22A of the reversing valve construction 20A of this invention can be formed in a manner similar to the housing means of the aforementioned patent to Hargraves, U.S. Pat. No. 3,985,154 by merely providing the tubular housing member 22A with a substantially cylindrical internal peripheral surface 63' throughout the length thereof of which a part 64' thereof defines the arcuate surface 33A of the valve seat means 32A so that no separate metallic valve seat member 22 need be provided in the reversing valve construction 20A of this invention as is required in the reversing valve construction 20 previously described.

The valve member 23A is formed of molded plastic material, such a polytetrafluoroethylene sold under the tradename TEFLON-TFE by E. I. Du Pont de Neumours, Inc. of Wilmington, Del., and comprises a main body portion 63 having a lower surface 64 integrally interconnected to an outwardly extending flexible sealing skirt 65 that extends completely around the lower surface 64 thereof and outwardly from the body portion thereof in the manner illustrated in FIGS. 3–5, the flexible skirt 65 and the bottom surface 64 of the valve member 23A each being arcuate in cross section as illustrated in the drawings to closely mate with the arcuate surface 33A of the valve seat means 32A as illustrated in FIGS. 3 and 4. In this manner, the lower arcuate surface 65' of the flexible skirt 65 is adapted to be disposed in sealing engagement against the arcuate surface 33A of the valve seat means 32A while permitting sliding movement relative thereto.

The flexible skirt 65 can be rendered more flexible by providing an annular groove 65" therein adjacent the main body 63 of the valve member 23A and when the aforementioned plastic material is being utilized to form the valve member 23A, the flexible skirt can be approximately 0.030 of an inch thick to render the same flexible for the sealing purpose hereinafter described.

The lower arcuate surface 64 of the valve member 23A is interrupted by the passage 43A so that the passage 43A can bridge the ports 34A and 35A or 35A and 36A together for the reasons previously set forth while the pressure in the intermediate chamber 31A of the housing 22A acts against the upper surface 66 of the flexible skirt 65 to flex and urge the same downwardly against the arcuate surface 33A of the valve seat means 32A to further assist in the sealing effect of the flexible skirt 65A about the passage 43A as the flexible skirt 65 tends to sealing conform to the contour of the surface 33A of the valve seat means 32A.

In this manner, not only does the natural bias of the flexible skirt 65 provide for sealing of the valve seat surface 33A, but also the force of the pressure fluid in the chamber 31A causes the flexible skirt 65 to seal and conform to the contour of the surface 33A of the valve seat means 32A and take up any tolerances that exist between the surface 64 of the valve member 23A and the surface 33A of the valve seat means 32A.

The flexible skirt 65 of the valve member 23A has opposed ends 67 and 68 respectively provided with cutouts 69 and 70 so that the cutout 69 will fully expose the port 34A to the chamber 31A when the valve member is in the position illustrated in FIG. 3 to interconnect the ports 35A and 36A together. Conversely, when the valve member 23A is moved to the left in FIG. 3 to cause the passage 43A to bridge the ports 34A and 35A, the cutout 70 fully exposes the port 36A to the intermediate chamber 31A for the reasons previously set forth.

In this manner, it can be seen that the valve member 23A and its integral, homogeneous flexible sealing skirt 65 can be simply formed by a molding operation to cause the valve member 23A to operate in a manner now to be described.

As the valve member 23A of the valve construction 20A is shifted from right to left or left to right in the tubular housing means 22A, in the same manner and for the same purpose as previously described, it can be seen that the arcuate flexible skirt 65 slides in sealing engagement agains the arcuate surface 33A of the valve seat means 32A to seal the resulting interconnected ports 35A and 36A or 34A and 35A from the intermediate pressurized chamber 31A of the tubular valve member 22A while fluidly interconnecting the particular pair of ports together as previously set forth, the arcuate flexible sealing skirt 65 being continuously flexed and urged into sealing engagement with the arcuate surface 33A of the valve seat means 32A not only by the natural resiliency of the flexible skirt 65, but also by the pressure in the chamber 31A acting on the upper surface 66 thereof so that the flexible skirt 65 has its lower surface 65' conform to the contour of the surface 33A of the valve seat means 32A in a more effective manner than the cooperating flat metallic surfaces 42 and 33 of the valve member 23 and valve seat member 32 of the previously described reversing valve construction 20.

Therefore, it can be seen that the reversing valve construction 20A of this invention provides a flexible sealing skirt 65 on the valve member 23A to seal the passage means 43A of the movable piston-like valve member 23A to the valve seat means 32A while permitting sliding movement therebetween in a manner believed to produce a more efficient reversing valve construction than the reversing valve construction 20 previously described.

While the flexible sealing skirt 65 previously described is formed integrally and homogeneously with the body portion 63 of the valve member 23A, it is to be understood that the flexible skirt of this invention could be formed separately from the valve member and thereafter be secured thereto to function in the same manner as the flexible skirt 65 previously described.

Figure 6:
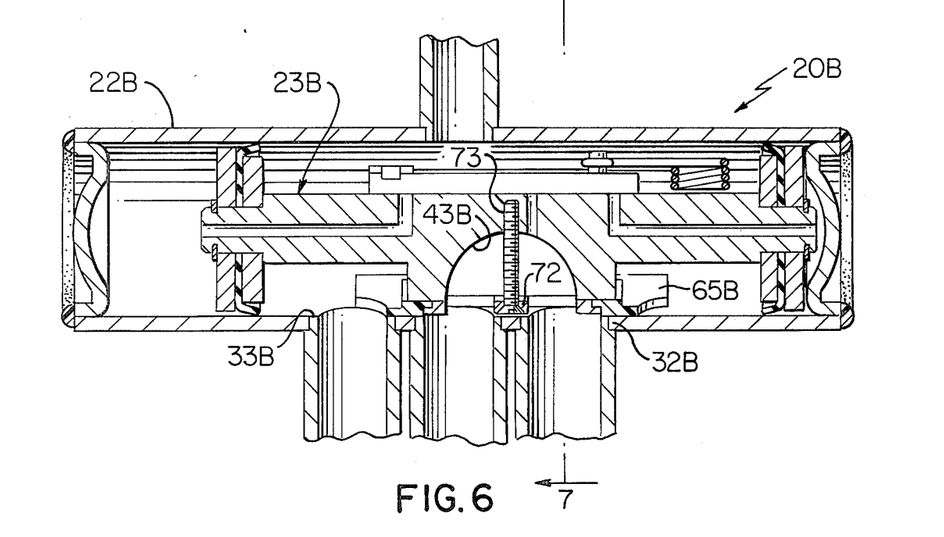
FIG. 6 is a fragmentary cross-sectional view similar to FIG. 3 and illustrates another embodiment of the reversing valve construction of this invention.
Figures 7, 8:
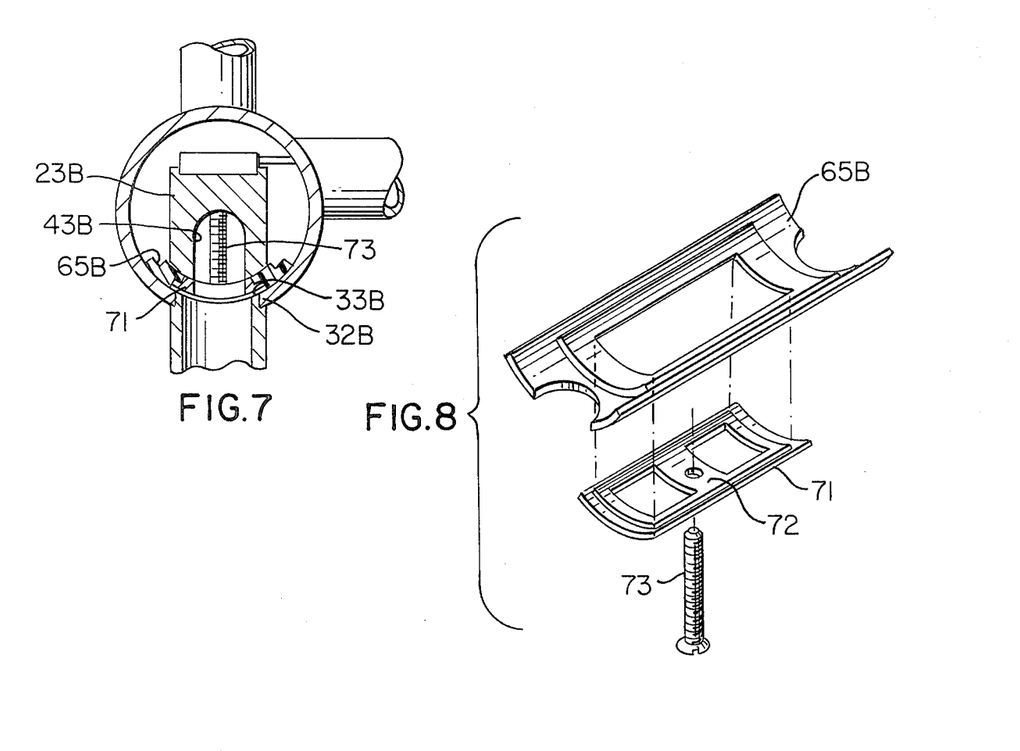
FIG. 7 is a cross-sectional view taken on line 7—7 of FIG. 6.
FIG. 8 is an exploded perspective view of certain parts of the valve member of the reversing valve construction of FIGS. 6 and 7.

In particular, another reversing valve construction of this invention is generally indicated by the reference numeral 20B in FIGS. 6 and 7 and parts thereof similar to the reversing valve construction 20A previously described are indicated by like reference numerals followed by the reference letter "B".

As illustrated in FIG. 6, the valve member 23B for the tubular housing means 22B can be formed of metal, pastic or any desired material and the same has a separate flexible sealing skirt 65B formed of rubber, plastic, etc. and formed in the annular manner illustrated in FIG. 8 so as to be clamped to the valve member 23B by a retainer member 71 formed of metal or any other suitable material and having a bridging, intermediate portion 72 bolted to the valve member 23B by a threaded fastening member 73 as illustrated whereby the flexible skirt 65B completely surrounds the passage means 43B of the valve member 23B throughout the entire lower area thereof. In this manner, the flexible skirt 65B fully conforms into sealing engagement with the arcuate surface 33B of the valve seat means 32B for the purposes previously described in connection with the flexible skirt 65.

Figure 9:
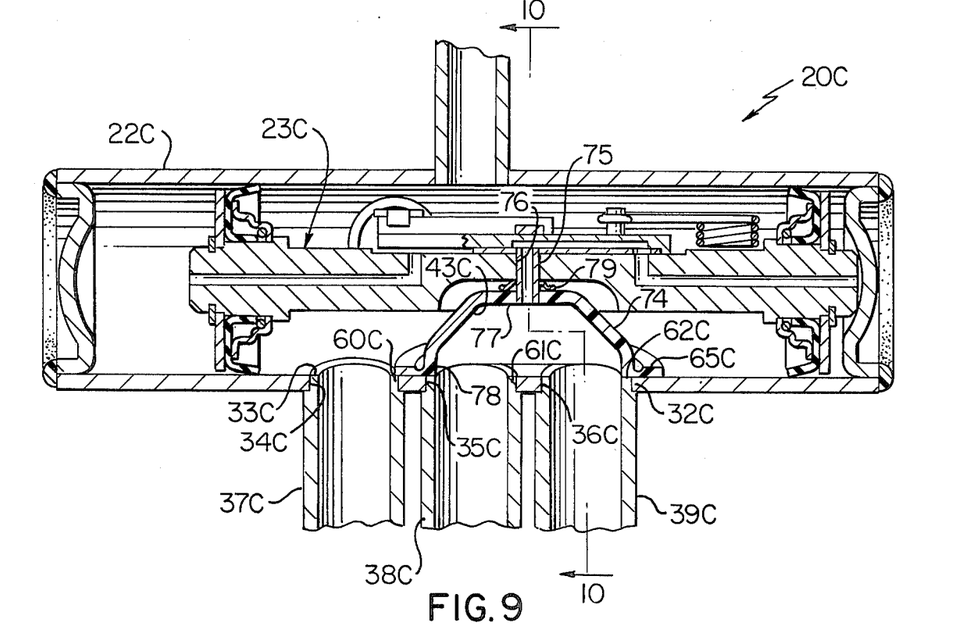
FIG. 9 is a fragmentary cross-sectional view similar to FIG. 3 and illustrates another embodiment of the reversing valve construction of this invention.
Figure 10:
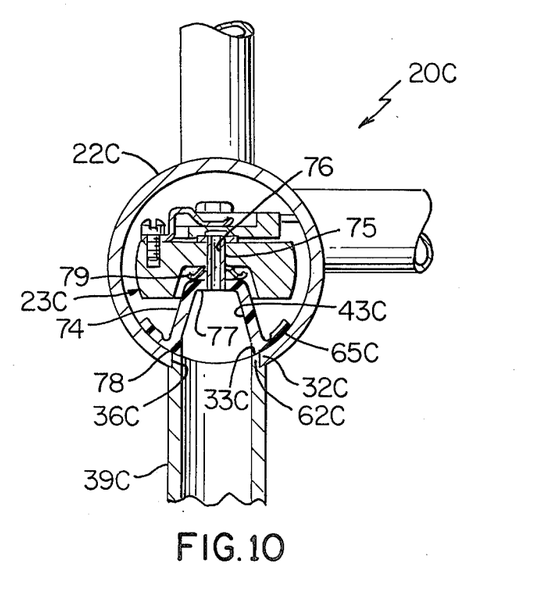
FIG. 10 is a cross-sectional view taken on line 10—10 of FIG. 9.

Referring now to FIGS. 9 and 10, another reversing valve construction of this invention is generally indicated by the reference numeral 20C and parts thereof similar to the reversing valve constructions 20, 20A and 20B are indicated by the like reference numerals followed by the reference letter "C".

The reversing valve construction 20C of FIGS. 9 and 10 has the tubular housing means 22C formed in the manner previously described to define an integral and homogeneous valve seat part 32C provided with an arcuate valve seat surface 33C that is interrupted by the ports 34C and 35C and 36C which respectively receive suitably formed ends 60C, 61C and 62C of the tubular connectors 37C, 38C and 39C as illustrated.

The valve member 23C has a movable cup-shaped part 74 provided with a tubular extension 75 which is slidingly received in an opening 76 formed in the valve member 23C, the tubular member 75 being carried by the closed end 77 of the cup-shaped member 74 while an integral annular flexible sealing skirt 65C is disposed around the open end 78 of the cup-shaped member 74 as illustrated for the sealing purposes previously described.

A resilient washer-like spring member 79 is disposed between the valve member 23C and the closed end 77 of the cup-shaped member 74 to continuously urge the cup-shaped part 74 and, thus, the flexible sealing skirt 65C into sealing engagement with the arcuate surface 33C of the valve seat means 32C as illustrated whereby the resulting chamber 43C of the cup-shaped member 74 is adapted to interconnect either the tubular connectors 38C and 39C or the tubular connectors 37C and 38C together depending upon the position of the piston-like valve member 23C in the tubular housing means 22C.

In this manner, the flexible sealing skirt 65C performs the same function as the sealing skirts 65A and 65B previously described while the spring means 79 takes up any loss of wear of the sealing skirt 65C so that the full force of the natural bias of the skirt 65C can be utilized for sealing purposes and not wear take up purposes as would be the case if the spring 79 were not provided.

Therefore, it can be seen that the flexible skirts 65, 65B and 65C of this invention each performs the sealing function for a reversing valve construction in the same manner as the sealing means and biasing means of the aforementioned copending patent applications without requiring a separate biasing means therefor. Also, the flexible skirts 65, 65B and 65C of this invention each readily permits the tubular housing means 22A, 22B or 22C to each be formed from a single tubular member without requiring a separate valve seat means disposed therein and without requiring flat valve seat surface against which the valve member is to engage as is required in the prior known reversing valve construction 20.

Therefore, it can be seen that this invention not only provides an improved reversing valve construction and a method of making the same, but also this invention provides an improved valve member for such a reversing valve construction and the like and a method of making the same.

While the forms and methods of this invention now preferred have been illustrated and described as required by the Patent Statute, it is to be understood that other forms and method steps can be utilized and still fall within the scope of the appended claims.

What is claimed is:

1. In a method of making a reversing valve construction having a housing means provided with a chamber carrying a movable piston-like valve member therein that controls port means of a valve seat means of said housing means through the relative position of passage means of said valve member relative to said port means, the improvement comprising the steps of forming a one-piece flexible sealing skirt to be carried by said valve member and extend outwardly therefrom in a cantilevered manner adjacent said valve seat means and providing said flexible sealing skirt with exposed surfaces so as to be exposed to fluid pressure in said chamber that will act directly thereon and cause said flexible skirt to flex and engage said valve seat means in a manner to tend to sealingly conform to the contour of said valve seat means and thereby seal said passage means to said valve seat means while permitting sliding movement therebetween.

2. A method of making a reversing valve construction as set forth in claim 1 and including the step of forming said flexible skirt to be annular and surround said passage means of said valve member.

3. A method of making a reversing valve construction as set forth in claim 2 and including the steps of forming said flexible skirt as a separate part from said valve member, and securing said skirt to said valve member.

4. A method of making a reversing valve construction as set forth in claim 3 wherein said securing step comprises the step of clamping said flexible skirt to said valve member with an annular retainer.

5. A method of making a reversing valve construction as set forth in claim 1 and including the steps of forming said flexible skirt to comprise a part separate from said valve member with said part containing said passage means therein, and interconnecting said part to said valve member in a manner to be movable relative thereto.

6. A method of making a reversing valve construction as set forth in claim 5 and including the step of disposing a biasing means between said flexible skirt and said valve member to tend to urge said flexible skirt toward said valve seat means.

7. A method of making a reversing valve construction as set forth in claim 1 wherein said valve seat means is formed with an arcuate cross-sectional surface.

8. A method of making a reversing valve construction as set forth in claim 7 and including the step of forming said flexible skirt to also have an arcuate cross-sectional surface that mates with said arcuate surface of said valve seat means.

9. A method of making a reversing valve construction as set forth in claim 1 and including the step of forming said port means to comprise first, second and third ports and said passage means to comprise a cavity in said valve member that will bridge said first and second ports while exposing said chamber to said third port when said valve member is in one position thereof and will bridge said second and third ports while exposing said chamber to said first port when said valve member is in another position thereof.

10. A method of making a reversing valve construction as set forth in claim 1 and including the step of forming said flexible skirt to be approximately 0.030 of an inch thick.

11. In a method of making a reversing valve construction having a housing means provided with a chamber carrying a movable piston-like valve member therein that controls port means of a valve seat means of said housing means through the relative position of passage means of said valve member relative to said port means, the improvement comprising the steps of forming a flexible sealing skirt to be carried by said valve member and extend outwardly therefrom adjacent said valve seat means, providing said flexible sealing skirt with exposed surfaces so as to be exposed to fluid pressure in said chamber that will act directly thereon and cause said flexible skirt to flex and engage said valve seat means in a manner to tend to sealingly conform to the contour of said valve seat means and thereby seal said passage means to said valve seat means while permitting sliding movement therebetween, and forming said flexible skirt to be an integral and homogeneous part of said valve member.

12. A method of making a reversing valve construction as set forth in claim 11 and including the step of forming said flexible skirt and said valve member from plastic material.

13. A method of making a reversing valve construction as set forth in claim 11 and including the step of forming said port means to comprise first, second and third ports and said passage means to comprise a cavity in said valve member that will bridge said first and second ports while exposing said chamber to said third port when said valve member is in one position thereof and will bridge said second and third ports while exposing said chamber to said first port when said valve member is in another position thereof.

14. A method of making a reversing valve construction as set forth in claim 11 and including the step of forming said flexible skirt to be approximately 0.030 of an inch thick.

15. A method of making a reversing valve construction as set forth in claim 11 and including the step of forming said valve seat means to have an arcuate cross-sectional surface.

16. A method of making a reversing valve construction as set forth in claim 15 and including the step of forming said flexible skirt also to have an arcuate cross-sectional surface that mates with said arcuate surface of said valve seat means.

17. In a method of making a piston-like valve member for a reversing valve construction having a housing means provided with a chamber and carrying said valve member therein so that the same controls port means of a valve seat means of said housing means through the relative position of passage means of said valve member relative to said port means, the improvement comprising the steps of forming a one-piece flexible sealing skirt to be carried by said valve member and extend outwardly therefrom in a cantilevered manner so as to be adapted to be adjacent said valve seat means and providing said flexible sealing skirt with exposed surfaces so as to be exposed to fluid pressure in said chamber that will act directly thereon and cause said flexible skirt to flex and engage said valve seat means in a manner to tend to sealingly conform to the contour of said valve seat means and thereby seal said passage means to said valve seat means while permitting sliding movement therebetween.

18. A method of making a valve member as set forth in claim 17 and including the step of forming said flexible skirt to be annular and surround said passage means of said valve member.

19. A method of making a valve member as set forth in claim 18 and including the step of forming said skirt with an arcuate cross-sectional suface.

20. A method of making a valve member as set forth in claim 18 and including the steps of forming said flexible skirt as a part separate from said valve member and containing said passage means therein, and interconnecting said part to said valve member in a manner to be movably carried thereby.

21. A method of making a valve member as set forth in claim 20 and including the step of disposing a biasing means between said flexible skirt and said valve member to tend to urge said flexible skirt toward said valve seat means.

22. A method of making a valve member as set forth in claim 17 and including the step of forming said passage means to comprise a cavity in said valve member that is adapted to bridge two ports at one time in said valve seat means.

23. A method of making a valve member as set forth in claim 17 and including the step of forming said flexible skirt to be approximately 0.030 of an inch thick.

24. In a method of making a piston-like valve member for a reversing valve construction having a housing means provided with a chamber and carrying said valve member therein so that the same controls port means of a valve seat means of said housing means through the relative position of passage means of said valve member relative to said port means, the improvement comprising the steps of forming a flexible sealing skirt to be carried by said valve member and extend outwardly therefrom so as to be adapted to be adjacent said valve seat means, providing said flexible sealing skirt with exposed surfaces so as to be exposed to fluid pressure in said chamber that will act directly thereon and cause said flexible skirt to flex and engage said valve seat means in a manner to tend to sealingly conform to the contour of said valve seat means and thereby seal said passage means to said valve seat means while permitting sliding movement therebetween, and forming said flexible skirt to be an integral and homogeneous part of said valve member.

25. A method of making a valve member as set forth in claim 24 and including the step of forming said flexible skirt and said valve member from plastic material.

26. A method of making a valve member as set forth in claim 24 and including the steps of forming said flexible skirt as a separate part from said valve member, and securing said skirt to said valve member.

27. A method of making a valve member as set forth in claim 26 wherein said securing step comprises the step of clamping said flexible skirt to said valve member with an annular retainer.

28. A method of making a valve member as set forth in claim 24 and including the step of forming said passage means to comprise a cavity in said valve member that is adapted to bridge two ports at one time in said valve seat means.

29. A method of making a valve member as set forth in claim 24 and including the step of forming said flexible skirt to be approximately 0.030 of an inch thick.

30. A method of making a valve member as set forth in claim 24 and including the step of forming said skirt to have an arcuate cross-sectional surface.

* * * * *